March 7, 1939.   N. LEVIN   2,149,449

SCANNING DEVICE

Filed March 23, 1935

INVENTOR
NYMAN LEVIN
BY
ATTORNEY

Patented Mar. 7, 1939

2,149,449

UNITED STATES PATENT OFFICE 2,149,449

SCANNING DEVICE

Nyman Levin, London, England, assignor to Radio Corporation of America, a corporation of Delaware Application March 23, 1935, Serial No. 12,606
In Great Britain March 23, 1934

3 Claims. (Cl. 178—7.6)

This invention relates to scanning devices for use in television and the like systems and more particularly to scanning devices of the so-called lens drum or lens wheel type.

Known constructions of lens drum or lens wheel usually comprise a plurality of simple convex lenses or achromatic doublets spaced equally round the periphery of a drum or wheel structure. The light efficiency obtained in such an arrangement is subject to certain definite limitations which will be described more clearly later herein.

The object of the present invention is to avoid these limitations and to provide a lens wheel or drum wherein a better light efficiency is obtainable.

According to this invention a television or like scanning system of the kind comprising a so-called lens wheel or drum is characterized in that the radiant energy forming the spot by which the picture area is scanned is projected thereon via a telephoto lens.

The lenses in a lens wheel or drum scanning device in accordance with this invention are thus made of the telephoto type instead of, as hitherto, simple convex lenses or achromatic doublets. The advantages of this will be better understood from the following theoretical description.

Where an ordinary lens drum is employed in connection with the scanning of a picture screen in, say, horizontal lines, the relation between the size of the aperture necessary, the diameter of the drum and the size of the screen is given approximately by the formula:

$$a = \frac{h}{pn} \frac{H}{H-h}$$

where $h$ is the distance between two lenses $p$ is the picture ratio $= \frac{H}{V}$ $n$ is the number of lines to be formed on the screen which is in general the number of lenses on the drum $H$ is the horizontal dimension of the required screen, assuming horizontal scanning $V$ is the vertical dimension of the required screen.

In the above formula $h$ is the distance between two consecutive lenses on the drum. This formula is only approximate by reason of the assumption inherent therein that the two principal planes are co-incident and situated in the center of the lenses. A more exact relationship is given by the expression:

$$a = \frac{h}{pn\left(1+\frac{d}{r}\right)} \frac{H}{H-h}$$

where $r$ is the radius to the first principal plane
$d$ is the distance between first and second principal planes, and
$h$ is the distance between two consecutive second principal planes.

In both the above formulae $a$ is the size of the aperture.

A lens drum in accordance with this invention avoids the limitation involved in the above formulae by reason of the fact that a telephoto lens may be constructed to have the second principal plane at a substantial distance beyond the lens, for example at a distance greater than two inches beyond it. As a result $h$ is considerably increased, thereby necessitating an increased size of aperture. Since the final brightness on screen scanned is proportional to the square of the aperture any increase in $h$ means a large increase in resultant luminous intensity. The comparison will be made clear from the following description taken in conjunction with the accompanying theoretical schematic drawing.

Figure 1:
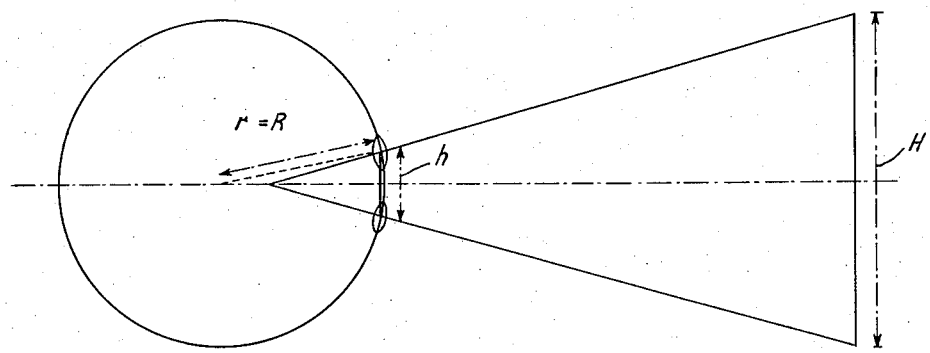
Fig. 1 shows an ordinary lens drum system of simple convex type.
Figure 2:
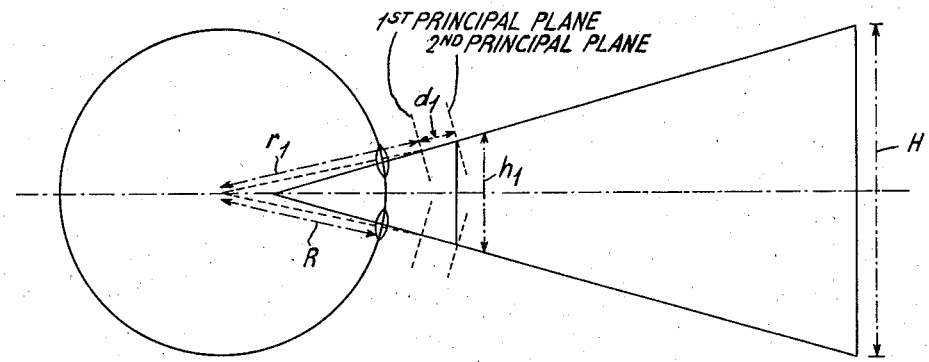
Fig. 2 shows a lens drum system using a telephoto lens.

Let $a$ $h$ $d$ and $r$ represent the corresponding values for an ordinary known lens drum system of the simple convex lens type and let $a_1$ $h_1$ $d_1$ and $r_1$ represent the corresponding values for a drum in accordance with this invention and containing telephoto lenses.

Then $$\frac{a_1}{a} = \frac{h_1}{h} \frac{r_1}{r} \frac{(r+d)}{(r_1+d_1)}$$

(Neglecting $\frac{H-h_1}{H-h}$ since $H-h_1 \doteqdot H-h$)

Now $$\frac{h_1}{h} = \frac{r_1+d_1}{r+d}$$

Therefore
$$\frac{a_1}{a} = \frac{r_1}{r}$$

Let R be the radius of the drum containing the lenses.
Then
$$r = R$$
and
$$r_1 = R - l_b + l$$

Where $l$ is the distance from the aperture to the first principal plane
and $l_b$ is the distance from the aperture to the back surface of the lens
Further, if H is large, as it generally is,
$l f_e'$ the equivalent focal length, and
$l_b = f_b'$ the back focal length,
Therefore
$$\frac{a_1}{a} = \frac{R - f_b' + f_e'}{R}$$

In general
$$f_b' = \tfrac{1}{2} f_e'$$
Therefore
$$\frac{a_1}{a} = \frac{R + \tfrac{1}{2} f_e'}{R}$$

Thus if
$$R = 6'' \text{ and } f_e' = 6''$$
$$\frac{a_1}{a} = \frac{3}{2}$$

Thus, since the efficiency is proportional to the square of the aperture, if the three halves ratio above set forth is obtained, the efficiency will be more than doubled.

Having now described the invention, what I claim and desire to secure by Letters Patent is the following:

1. In a scanning system, the combination of a drum type scanning member, and telephoto lenses, each of said lenses having its first principal plane intermediate the lens and the second principal plane of the lens.

2. In a scanning system, the combination of a drum type scanning member, and telephoto lenses, each of said lenses having its second principal plane at least two inches beyond the lens.

3. In a scanning system, the combination of a drum type scanning member, telephoto lenses, each of said lenses having its first principal plane intermediate the lens and the second principal plane, and means to support said lenses on the periphery of the scanning member in accordance with a predetermined order of line scanning.

NYMAN LEVIN.